US012620180B2

(12) United States Patent
Pizana et al.

(10) Patent No.: US 12,620,180 B2
(45) Date of Patent: May 5, 2026

(54) AUGMENTED VIRTUAL OFFICE LAYOUT

(71) Applicant: INTERNATIONAL BUSINESS MACHINES CORPORATION, Armonk, NY (US)

(72) Inventors: Luis Osvaldo Pizana, Austin, TX (US); Su Liu, Austin, TX (US); Fang Lu, Billerica, MA (US); Nadiya Kochura, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 17/821,932

(22) Filed: Aug. 24, 2022

(65) Prior Publication Data

US 2024/0070991 A1 Feb. 29, 2024

(51) Int. Cl.
| | |
|---|---|
| *G06T 19/00* | (2011.01) |
| *G06Q 10/0639* | (2023.01) |
| *G06Q 10/105* | (2023.01) |
| *G06V 20/20* | (2022.01) |

(52) U.S. Cl.
CPC ....... *G06T 19/006* (2013.01); *G06Q 10/0639* (2013.01); *G06Q 10/105* (2013.01); *G06V 20/20* (2022.01)

(58) Field of Classification Search
CPC ...................................................... G06F 3/067
See application file for complete search history.

(56) References Cited

U.S. PATENT DOCUMENTS

| | | | |
|---|---|---|---|
| 10,917,613 B1 * | 2/2021 | Chiarella | ............... H04N 7/157 |
| 11,516,036 B1 * | 11/2022 | Harathi | ............... H04L 12/1822 |
| 2008/0281912 A1 | 11/2008 | Dillenberger | |
| 2017/0315696 A1 | 11/2017 | Jacobson | |
| 2018/0373803 A1 * | 12/2018 | Shultz | ................ G06F 16/9577 |
| 2020/0143795 A1 | 5/2020 | Park | |
| 2021/0073742 A1 | 3/2021 | Janakiraman | |
| 2021/0209862 A1 * | 7/2021 | Seva | ....................... G06T 19/20 |

(Continued)

FOREIGN PATENT DOCUMENTS

| | | | | |
|---|---|---|---|---|
| CN | 115221566 A | * 10/2022 | ............. | G06F 21/78 |
| WO | 2012053001 A2 | 4/2012 | | |

OTHER PUBLICATIONS

Disclosed Anonymously, "A System and Method for Mapping Physical Locations into Virtual Spaces," An IP.com Prior Art Database Technical Disclosure, IP.com No. IPCOM000169442D, IP.com Electronic Publication Date: Apr. 16, 2008, 4 pages.

(Continued)

*Primary Examiner* — Di Xiao

(74) *Attorney, Agent, or Firm* — Jordan T. Schiller

(57) ABSTRACT

The program intelligently assigns a virtual office layout (VOL) to one or more actual users' real on-site office layout (ROL) based on human resource mapping. The method maps the one or more actual users' ROL to a correlated VOL, according to human resource data and a real building floor map. The method creates an augmented virtual office layout (AVOL) based on the mapping. The method customizes the AVOL according to the one or more actual users' preferences and real office location and tracks the one or more users' activities on the AVOL. The method renders the one or more users' real or preferred office location and the one or more users' virtual position on the AVOL.

17 Claims, 3 Drawing Sheets

(56) References Cited

U.S. PATENT DOCUMENTS

2022/0398060 A1* 12/2022 Kadonoff .............. G06F 3/1446
2023/0413003 A1* 12/2023 Smith .................... H04S 7/303

OTHER PUBLICATIONS

Disclosed Anonymously, "Method and System for Adapting Virtual Meeting Rooms", An IP.com Prior Art Database Technical Disclosure, IP.com No. IPCOM000230845D, IP.com Electronic Publication Date: Apr. 16, 2008, 4 pages.

Konrad Legal, "8 Reasons Why should You Set Up A Virtual Office In Thailand", Accessed on Jun. 10, 2022, 2 pages, https://www.konradlegal.com/2017/10/12/8-reasons-why-should-you-set-up-a-virtual-office-in-thailand/.

Konrad Legal, "Company Formation In Thailand", Accessed on Jun. 10, 2022, 2 pages, https://www.konradlegal.com/2015/07/01/company-formation-in-thailand/.

Konrad Legal, "Four Benefits for You to Set Up Virtual Office in Thailand", Accessed on Jun. 10, 2022, 3 pages, https://www.konradlegal.com/2016/06/08/four-benefits-set-virtual-office-thailand/.

Lin, "My Digital Office (MDO) Review—A Virtual Office Like No Other", Accessed on Jun. 10, 2022, 4 pages, https://aloa.co/blog/my-digital-office-mdo-review-a-virtual office-like-no-other.

Nijholt et al., "The distributed virtual meeting room exercise," Workshop Mmmp, ICMI, Oct. 2005, pp. 93-99.

Sharma, et al., "Workplace Collaboration in a 3D Virtual Office," 2011 IEEE International Symposium on VR Innovation, Mar. 19-20, 2011, pp. 3-10, Singapore, KR.

Wonder, "Let's get started! Team Offices", A virtual Space for Groups to get Together, Accessed on Jun. 10, 2022, pages, https://app.wonder.me/?spaceId=34a4482b-9b5d-4ed4-a6cd-adf4a2b20b8f.

* cited by examiner

100

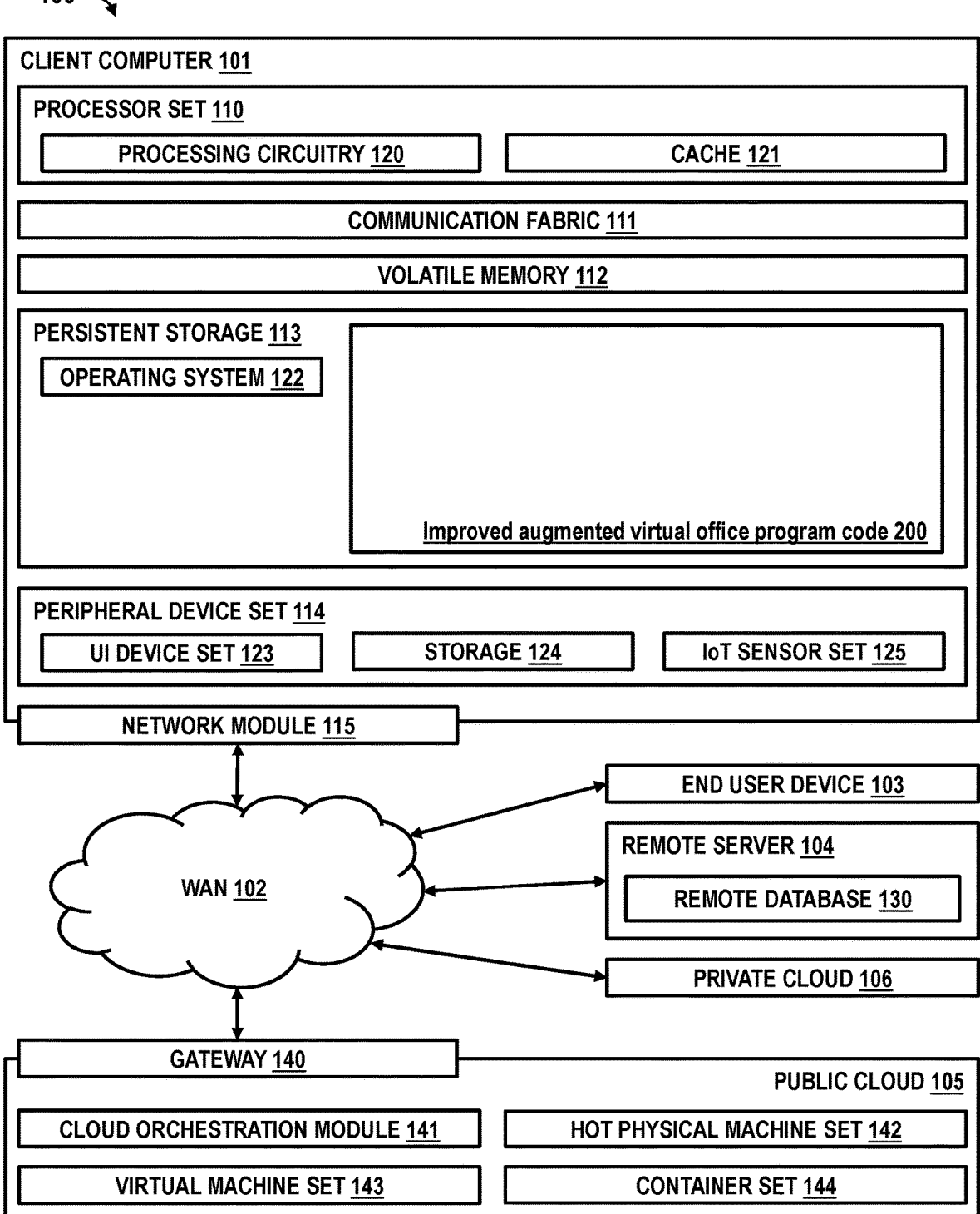

CLIENT COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

Improved augmented virtual office program code 200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOT PHYSICAL MACHINE SET 142

VIRTUAL MACHINE SET 143    CONTAINER SET 144

*FIG. 1*

AUGMENTED VIRTUAL OFFICE LAYOUT

BACKGROUND

The present disclosure relates generally to the field of cognitive computing and more particularly to data processing and virtual reality (VR) systems.

In recent times, working remotely has become a familiar aspect of many people's lives. Virtual offices and related software development are forecasted to become very hot areas due to hybrid working environments (e.g., remote and on-site working).

The United States is expected next year to have 53% of its entire workforce working remotely at least a few days a week; the United Kingdom 52%; Germany 37%; and France 33%. Overall work remote rates for India and China are expected to remain relatively low at approximately 30% and 28% respectively, however due to their sheer numbers, these countries will provide the global economy with a significantly large number of workers working remotely.

While there are many advantages to virtual office layouts (VOL), they currently lack the ability to be intelligently mapped to real onsite office layouts.

BRIEF SUMMARY

Embodiments of the present invention disclose a method, a computer program product, and a system, for intelligently assigning a virtual office layout (VOL) to one or more actual users' real office layout (ROL) based on human resource mapping.

According to an embodiment, the method maps the one or more actual users' real office layout (ROL) to a correlated virtual office layout (VOL), according to human resource data and a real building floor map. The method further creates an augmented virtual office layout (AVOL) based on the mapping. The method further customizes the AVOL according to the one or more actual users' preferences and real office location and tracks the one or more users' activities on the AVOL. The method further renders the one or more users' real or preferred office location and the one or more users' virtual position on the AVOL.

A computer program product, according to an embodiment of the invention, includes a non-transitory tangible storage device having program code embodied therewith. The program code is executable by a processor of a computer to perform a method. The method maps the one or more actual users' real office layout (ROL) to a correlated virtual office layout (VOL), according to human resource data and a real building floor map. The method further creates an augmented virtual office layout (AVOL) based on the mapping. The method further customizes the AVOL according to the one or more actual users' preferences and real office location and tracks the one or more users' activities on the AVOL. The method further renders the one or more users' real or preferred office location and the one or more users' virtual position on the AVOL.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method maps the one or more actual users' real office layout (ROL) to a correlated virtual office layout (VOL), according to human resource data and a real building floor map. The method further creates an augmented virtual office layout (AVOL) based on the mapping. The method further customizes the AVOL according to the one or more actual users' preferences and real office location and tracks the one or more users' activities on the AVOL. The method further renders the one or more users' real or preferred office location and the one or more users' virtual position on the AVOL.

BRIEF DESCRIPTION OF THE DRAWINGS

FIG. 1 depicts a diagram graphically illustrating the hardware components of augmented virtual office layout environment 100 and a cloud computing environment, in accordance with an embodiment of the present invention.

DETAILED DESCRIPTION

Figure 2:
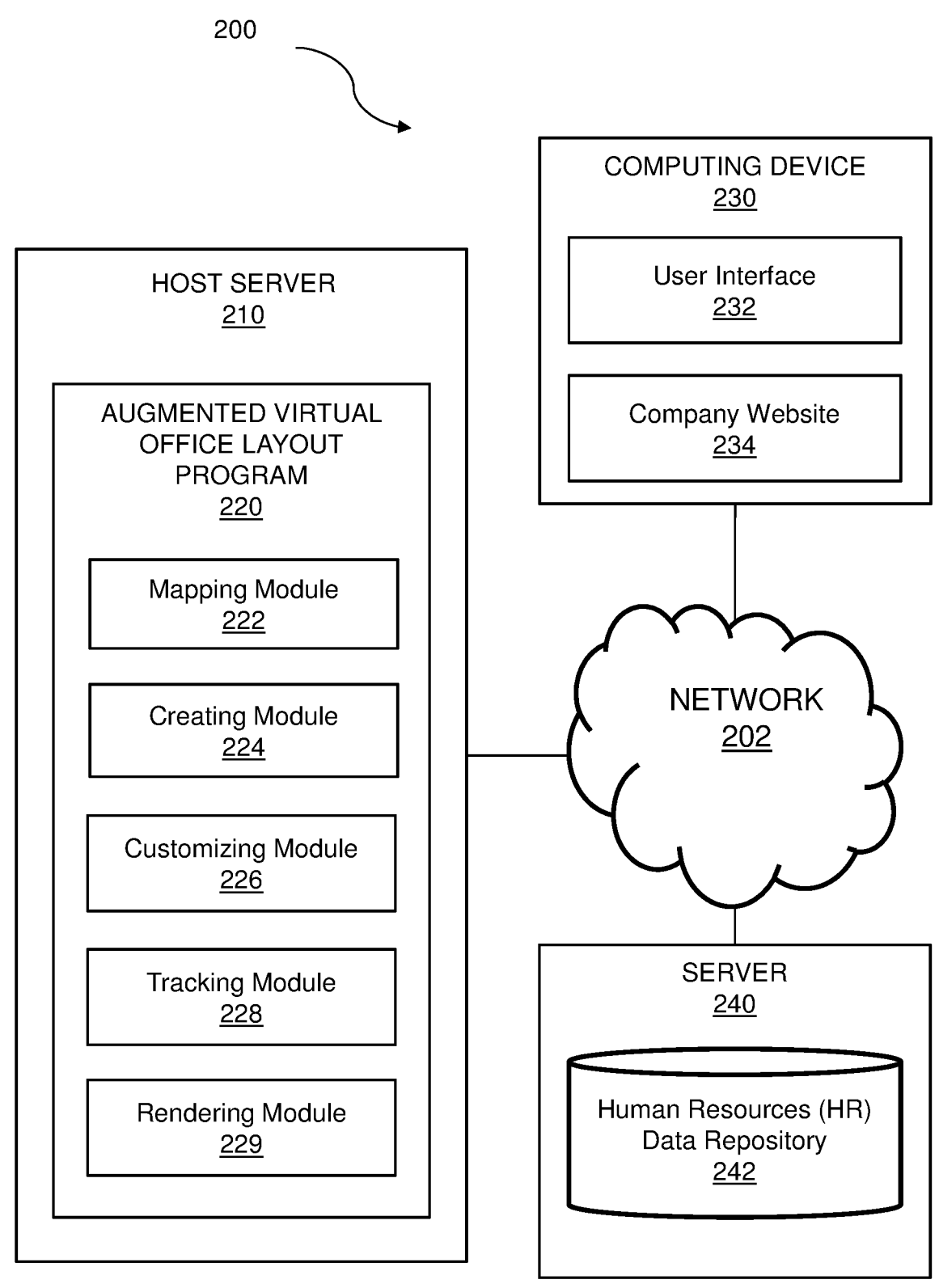
FIG. 2 illustrates augmented virtual office layout computing environment 200, in accordance with an embodiment of the present invention.

The present invention discloses a method for intelligently assigning a virtual office layout (VOL) to one or more actual users' real on-site office layout (ROL) based on human resource mapping.

The present invention provides an augmented virtual office layout for enhancing remote working experiences.

There are numerous advantages to owning a virtual office. For example, potential clients may require personally visiting one's office and discussing offered services face-to-face. If the business owner is unavailable to meet with potential clients, the virtual office has trained staff to attend to the clients' phone calls and handle email correspondence.

Furthermore, a virtual office is a modern solution to ensure any business owner's corporate presence in the marketplace. By owning a virtual office, the business owner has access to all modern communication facilities and provides flexibility to one's business. Also, it is the most cost-effective way to start a business since there are no conventional lease and employment expenses.

An example of a modern-day virtual office requires a user login. Once logged in, the user sees his/her virtual office and respective avatar in the layout.

However, the problem with modern-day virtual office space is the office layout cannot be intelligently mapped to the user's real on-site office layout. It is not convenient to find and "walk to" one's peers' offices in a virtual office layout. People need to manually adjust their virtual office layout to their familiar "brick and mortar" office layout.

The present invention creates virtual office space that mirrors the company structure to provide insights to potential business partners when he/she evaluates a company's operations. In other words, the virtual office is intended to replicate an "in-person" visit to the company office.

Hereinafter, exemplary embodiments of the present invention will be described in detail with reference to the attached drawings.

The present invention is not limited to the exemplary embodiments below but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a diagram graphically illustrating the hardware components of augmented virtual office layout computing environment 100 and a cloud computing environment in accordance with an embodiment of the present invention.

Augmented virtual office layout computing environment 100 contains an example of an environment for the execution of at least some of the computer code involved in performing the inventive methods, such as improved augmented virtual office program code 200. In addition to improved augmented virtual office program code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates augmented virtual office layout computing environment 200, in accordance with an embodiment of the present invention. Augmented virtual office layout computing environment 200 includes host server 210, and computing device 230, and server 240 all connected via network 202. The setup in FIG. 2 represents an example embodiment configuration for the present invention and is not limited to the depicted setup to derive benefit from the present invention.

In an exemplary embodiment, host server 210 includes augmented virtual office layout program 220. In various embodiments, host server 210 may be a laptop computer, tablet computer, netbook computer, personal computer (PC), a desktop computer, a personal digital assistant (PDA), a smart phone, or any programmable electronic device capable of communicating with computing device 230 and server 240 via network 202. Host server 210 may include internal and external hardware components, as depicted, and described in further detail with reference to FIG. 1. In other embodiments, host server 210 may be implemented in a cloud computing environment, as further described in relation to FIG. 1 herein. Host server 210 may also have wireless connectivity capabilities allowing it to communicate with computing device 230, server 240, and other computers or servers over network 202.

With continued reference to FIG. 2, computing device 230 includes user interface 232 and company website 234 and may be a laptop computer, tablet computer, netbook computer, personal computer (PC), a desktop computer, a personal digital assistant (PDA), a smart phone, or any programmable electronic device capable of communicating with host server 210 and server 240 via network 202. Computing device 230 may include internal and external hardware components, as depicted, and described in further detail below with reference to FIG. 1. In other embodiments, computing device 230 may be implemented in a cloud computing environment, as described in relation to FIG. 1, herein.

In exemplary embodiments, user interface 232 is a computer program which allows a user to interact with computing device 230 and other connected devices via network 202. For example, user interface 232 may be a graphical user interface (GUI). In addition to comprising a computer program, user interface 232 may be connectively coupled to hardware components, such as those depicted in FIG. 1, for receiving user input. In an exemplary embodiment, user interface 232 may be a web browser, however in other embodiments user interface 232 may be a different program capable of receiving user interaction and communicating with other devices.

In exemplary embodiments, company website 234 may include a secure log-in portal for a company where employees input a username, an identification number, and unique password to access private company information via human resource (HR) data repository 242.

With continued reference to FIG. 2, server 240 comprises human resource (HR) data repository 242 and may be a laptop computer, tablet computer, netbook computer, personal computer (PC), a desktop computer, a personal digital assistant (PDA), a smart phone, or any programmable electronic device capable of communicating with host server 210 and computing device 230 via network 202.

In exemplary embodiments human resource (HR) data repository 242 comprises private company information which may include, but is not limited to, human resource data of one or more users, peers, departments, and business units. Private company information may further include the building floor plan for a user's office space, a user's department and the location of a user's peers' offices within the building floor plan. HR data repository 242 further includes user preferences according to respective user profiles, a user's placement within an organization chart of the company, and so forth.

With continued reference to FIG. 2, host server 210 includes augmented virtual office layout (AVOL) program 220. Host server 210 may be a laptop computer, tablet computer, netbook computer, personal computer (PC), a desktop computer, a personal digital assistant (PDA), a smart phone, or any programmable electronic device capable of communicating with computing device 230 and server 240 via network 202.

AVOL program 220 is based on a real human resource map (e.g., assigned physical office location, office number, etc.) to intelligently assign a user's office into a virtualized workspace.

With continued reference to FIG. 2, augmented virtual office layout program 220, in an exemplary embodiment, may be a computer application on host server 210 that contains instruction sets, executable by a processor. The instruction sets may be described using a set of functional modules. In exemplary embodiments, augmented virtual office layout program 220 may receive input from computing device 230 and server 240 over network 202. In alternative embodiments, augmented virtual office layout program 220 may be a computer application on computing device 230, or a standalone program on a separate electronic device.

With continued reference to FIG. 2, the functional modules of augmented virtual office layout program 220 include mapping module 222, creating module 224, customizing module 226, tracking module 228, and rendering module 229.

Figure 3:
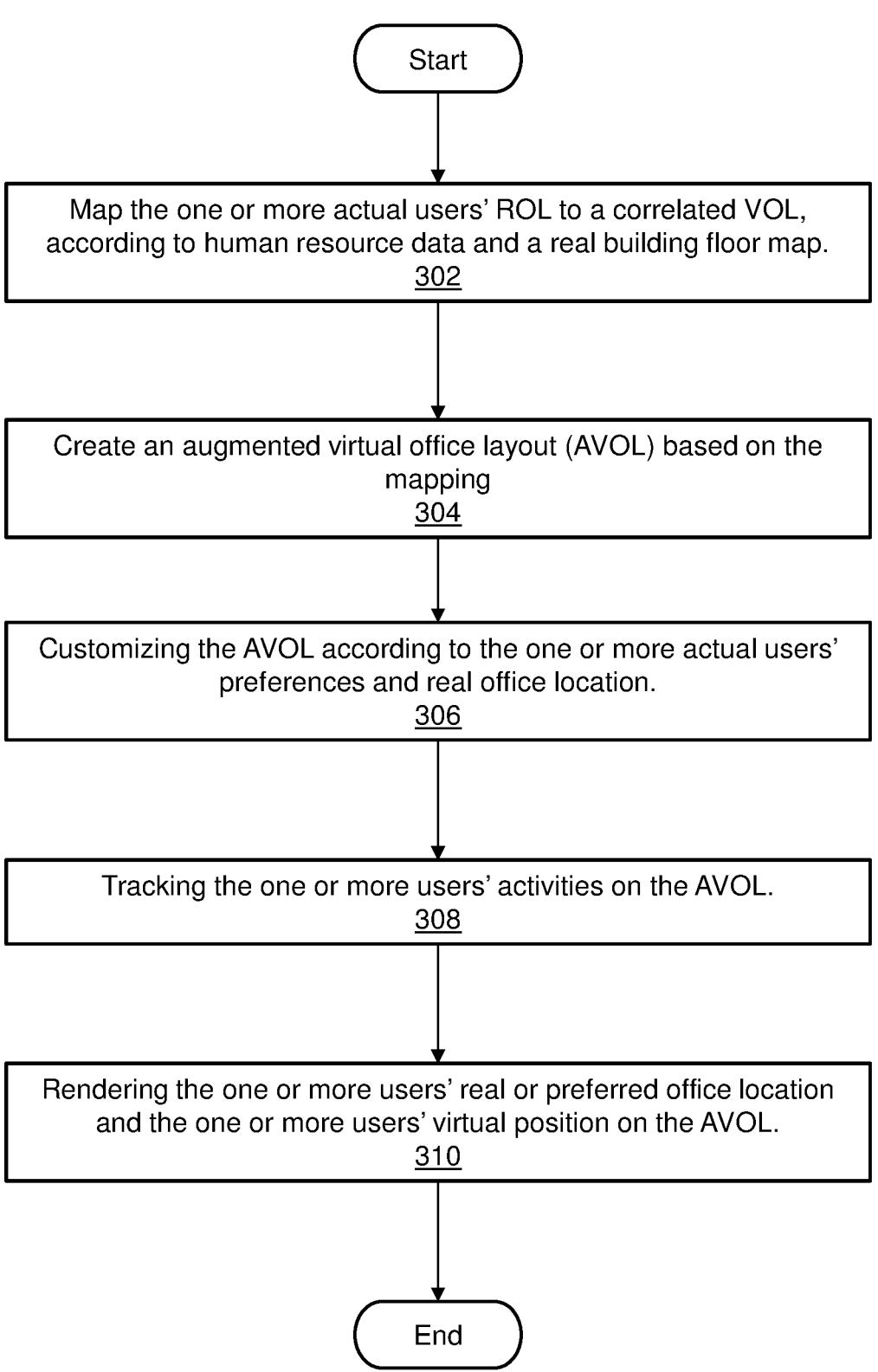
FIG. 3 is a flowchart illustrating the operation of augmented virtual office layout program 220 of FIG. 2, in accordance with an embodiment of the present invention.

FIG. 3 is a flowchart illustrating the operation of augmented virtual office layout program 220 of FIG. 2, in accordance with embodiments of the present disclosure.

With reference to FIGS. 2 and 3, mapping module 222 includes a set of programming instructions, in augmented virtual office layout program 220, to map one or more actual users' real office layout (ROL) to a correlated virtual office layout (VOL), according to human resource data and a real building floor map (step 302). The set of programming instructions is executable by a processor.

In exemplary embodiments, mapping module 222 defines a data structure for handling the operation of updating and mapping a real on-site office layout (ROL) to a correlated virtual office layout (VOL). For example, the data structure may include the following inputs from HR Data Repository 242: AVOL_Data (VirtualOfficeLayoutID, RealOfficeLayoutID, UserID, UserOfficeNumber, HRDataRepositoryID).

With reference to an illustrative example, mapping module 222 accesses a user's information from HR Data Repository 242 based on log-in credentials. In this case, employee Su Liu has the following employees data: UserID=93055; UserName="Su Liu"; UserLocationCity="Austin"; UserOfficeBuildingNumber="045"; UserOfficeOfficeNumber="3L0125"; UserDepartment="7K2". Additionally, mapping module 222 find peers of Su Liu in the UserDepartment "7K2", together with the peers' UserOfficeBuildingNumber and UserOfficeOfficeNumber.

With continued reference to FIGS. 2 and 3, creating module 234 includes a set of programming instructions in augmented virtual office layout program 220, to create an augmented virtual office layout (AVOL) based on the mapping (step 304). The set of programming instructions is executable by a processor.

In exemplary embodiments, creating module 234 creates a VirtualOfficeLayoutID based on the real office layout map, according to city location, office building number, office number, and department ID (e.g., customer support, development, IT maintenance, and so forth).

With reference to the illustrative example above, creating module 234 creates an AVOL mapping table for a team VirtualOfficeLayoutID based on Su Liu's UserDepartment="7K2". The created VirtualOfficeLayoutID includes all of Su Liu's specific inputs that identically match his real-world office layout.

With continued reference to FIGS. 2 and 3, customizing module 236 includes a set of programming instructions in augmented virtual office layout program 220, to customize the AVOL according to the one or more actual users' preferences and real office location (step 306). The set of programming instructions is executable by a processor.

In exemplary embodiments, customizing module 236 maintains the HR Data Repository 242 with up-to-date information about employee office information, peers and peer's respective office information, building organization, and so forth. For example, customizing module 236 can obtain, add, delete, and update information according to updated changes.

In exemplary embodiments, customizing module 236 allows the one or more users to define AVOL criteria and AVOL algorithms, and to customize their VOL preferences. Augmented virtual office layout program 220 analyzes the predefined and defined AVOL criteria, AVOL algorithms, and the customized VOL user preferences.

In exemplary embodiments, customizing module 236 updates the AVOL-ROL mapping table according to the analyzed output.

With continued reference to the illustrative example above, Su Liu can customize his AVOL by personally defining AVOL criteria and user preferences. For example, Su wants to view the offices of the entire department in his customized AVOL, while Su's colleague Daniel customizes his AVOL to only include peers' offices that are part of his working team.

With continued reference to FIGS. 2 and 3, tracking module 238 includes a set of programming instructions in augmented virtual office layout program 220, to track the one or more users' activities on the AVOL (step 308). The set of programming instructions is executable by a processor.

In exemplary embodiments, tracking module 238 collects a company's profile information, nature of the company's business model, and social trending information about the company when rendering the AVOL.

In exemplary embodiments, tracking module 238 monitors the one or more users' activities on the AVOL which can include the outcome and success rate of a user's business meetings conducted in the augmented virtual office layout. For example, augmented virtual office layout program 220 associates and analyzes one or more settings in the augmented virtual office layout that provide positive experience versus a negative experience in the business meetings.

In exemplary embodiments, tracking module 238 collects historical data of the monitored outcome and success rates of the business meetings and the associated one or more settings in the AVOL that provide a positive experience versus a negative experience in the business meeting. Furthermore, tracking module 238 can improve the one or more settings of the AVOL to generate improved outcomes and positive experiences for future business meetings.

For example, with reference to the illustrative example above, Su Liu's "moving" activities within the virtual office are detected and his peers can see whether Su is in his office or elsewhere (e.g., out to lunch, in the conference room, etc.).

With continued reference to FIGS. 2 and 3, rendering module 239 includes a set of programming instructions in augmented virtual office layout program 220, to render the one or more users' real or preferred office location and the one or more users' virtual position on the AVOL (step 310). The set of programming instructions is executable by a processor.

With reference to an additional illustrative example, Business "X" identifies software startup company "Alpha" as a potential partner to sign up as a client. Previous practice would entail performing an on-site in-person visit to Alpha's company premises to evaluate their operations and talk to the management supervisors and staff. However, Alpha operates with its developers working remotely and uses a Data Center to host IT infrastructure. Alpha has built a virtual office that reflects the company's profile and structure. Alpha's AVOL has dedicated a number of development spaces that match the number of employed software developers, an HR office, and IT room with a number of computer slots that mimic the Data Center hosted computing. Business "X" visits Alpha's virtual office space and performs meetings in the dedicated meeting room and reviews the IT infrastructure. Business "X" is satisfied with the replicated virtual "in-person" visit prior to signing a contract with Alpha.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, computing device 230, and server 240.

The invention claimed is:

1. A computer-implemented method for intelligently assigning a virtual office layout (VOL) to one or more users' real on-site office layout (ROL) based on human resource mapping, comprising:
   mapping the one or more users' ROL to a correlated VOL, according to human resource data and a real building floor map;
   creating an augmented virtual office layout (AVOL) based on the mapping;
   customizing the AVOL according to preferences and real office location of the one or more users;
   tracking activities of the one or more users' on the AVOL;
   rendering the one or more users' real or preferred office location and virtual position of the one or more users' on the AVOL; and
   collecting a company's profile information when rendering the AVOL.

2. The computer-implemented method of claim 1, further comprising:
   maintaining a human resource data repository;
   allowing the one or more users to define AVOL criteria and AVOL algorithms, and to customize VOL preferences;
   analyzing defined AVOL criteria, AVOL algorithms, and the customized VOL preferences; and
   updating an AVOL-ROL mapping table based on the analysis.

3. The computer-implemented method of claim 2, further comprising:
   defining a data structure for updating the AVOL-ROL mapping table; and
   introducing an AVOL mechanism for mapping the one or more users' ROL layout to a correlated VOL based on the human resource data repository.

4. The computer-implemented method of claim 1, further comprising:
   monitoring outcome and success rate of a business meeting conducted in the AVOL.

5. The computer-implemented method of claim 4, further comprising:
   associating one or more settings in the AVOL that provide a positive experience versus a negative experience in the business meeting.

6. The computer-implemented method of claim 5, further comprising:
   collecting historical data of the monitored outcome and success rate of the business meeting and the associated one or more settings in the AVOL that provide a positive experience versus a negative experience in the business meeting; and
   improving the one or more settings of the AVOL to generate positive experiences of future business meetings.

7. A computer program product for implementing a program that manages a device, comprising a non-transitory tangible storage device having program code embodied therewith, the program code executable by a processor of a computer to perform a method, the method comprising:
   mapping one or more users' ROL to a correlated VOL, according to human resource data and a real building floor map;
   creating an augmented virtual office layout (AVOL) based on the mapping;
   customizing the AVOL according to preferences and real office location of the one or more users;
   tracking activities on the AVOL of the one or more users;
   rendering the one or more users' real or preferred office location and virtual position of the one or more users on the AVOL; and
   collecting a company's profile information when rendering the AVOL.

8. The computer program product of claim 7, further comprising:
   maintaining a human resource data repository;
   allowing the one or more users to define AVOL criteria and AVOL algorithms, and to customize VOL preferences;
   analyzing defined AVOL criteria, AVOL algorithms, and the customized VOL preferences; and
   updating an AVOL-ROL mapping table based on the analysis.

9. The computer program product of claim 8, further comprising:
   defining a data structure for updating the AVOL-ROL mapping table; and
   introducing an AVOL mechanism for mapping the one or more users' ROL layout to a correlated VOL based on the human resource data repository.

10. The computer program product of claim 7, further comprising:
   monitoring outcome and success rate of a business meeting conducted in the AVOL.

11. The computer program product of claim 10, further comprising:
   associating one or more settings in the AVOL that provide a positive experience versus a negative experience in the business meeting.

12. The computer program product of claim 11, further comprising:
   collecting historical data of the monitored outcome and success rate of the business meeting and the associated one or more settings in the AVOL that provide a positive experience versus a negative experience in the business meeting; and
   improving the one or more settings of the AVOL to generate positive experiences of future business meetings.

13. A computer system for implementing a program that manages a device, comprising:

one or more computer devices each having one or more processors and one or more tangible storage devices; and a program embodied on at least one of the one or more storage devices, the program having a plurality of program instructions for execution by the one or more processors, the program instructions comprising instructions for:

mapping one or more users' ROL to a correlated VOL, according to human resource data and a real building floor map;

creating an augmented virtual office layout (AVOL) based on the mapping;

customizing the AVOL according to preferences and real office location of the one or more users;

tracking activities on the AVOL of the one or more users;

rendering the one or more users' real or preferred office location and virtual position of the one or more users on the AVOL; and collecting a company's profile information when rendering the AVOL.

14. The computer system of claim 13, further comprising:

maintaining a human resource data repository;

allowing the one or more users to define AVOL criteria and AVOL algorithms, and to customize VOL preferences;

analyzing defined AVOL criteria, AVOL algorithms, and the customized VOL preferences; and updating an AVOL-ROL mapping table based on the analysis.

15. The computer system of claim 14, further comprising:

defining a data structure for updating the AVOL-ROL mapping table; and introducing an AVOL mechanism for mapping the one or more users' ROL layout to a correlated VOL based on the human resource data repository.

16. The computer system of claim 13, further comprising:

monitoring outcome and success rate of a business meeting conducted in the AVOL.

17. The computer system of claim 16, further comprising:

associating one or more settings in the AVOL that provide a positive experience versus a negative experience in the business meeting.

\* \* \* \* \*